Sept. 19, 1967       J. D. BAIRD       3,342,284
WEB POSITION MEASURING DEVICE AND METHOD
Filed Jan. 10, 1966

3,342,284
WEB POSITION MEASURING DEVICE
AND METHOD
James D. Baird, Hauppauge, N.Y.
(333 Jackson Ave., Syosset, N.Y. 11791)
Filed Jan. 10, 1966, Ser. No. 519,651
3 Claims. (Cl. 181—.5)

ABSTRACT OF THE DISCLOSURE

A sensor for determining the position of a web of material relative to a predetermined path comprising transducer means for establishing an ultrasonic energy field adjacent opposite edges of a web and means responsive to tranducer means for providing a signal having a magnitude and polarity corresponding to the extent and direction of displacement of the web from a predetermined path.

---

This invention relates to position measuring a web or film by use of ultrasonic waves.

Positioning of a moving web has been tried by use of light beams using photoelectric cells. Also pneumatic means and mechanical means have been tried. But all these prior art devices are subject to disadvantages such as dust in the air, ambient light conditions, linearity, inability to accommodate changes in web width, etc.

Where photographic film is to be positioned, use of light beams is impossible.

It is a specific object of this invention to provide a means for position measuring a moving photographic film in a darkened room.

It is a general object of this invention to provide a new method of web position measuring using ultrasonic waves.

It is another object to provide a means of web positioning webs of various width without repositioning the sensor each time the width is deliberately changed.

A further object is to provide a web position measuring process and apparatus which indicates direction of web centerline movement as well as the amount of movement.

This invention is disclosed herein by means of an illustrative embodiment thereof, which is shown in the accompanying drawing in which.

Figure 1:
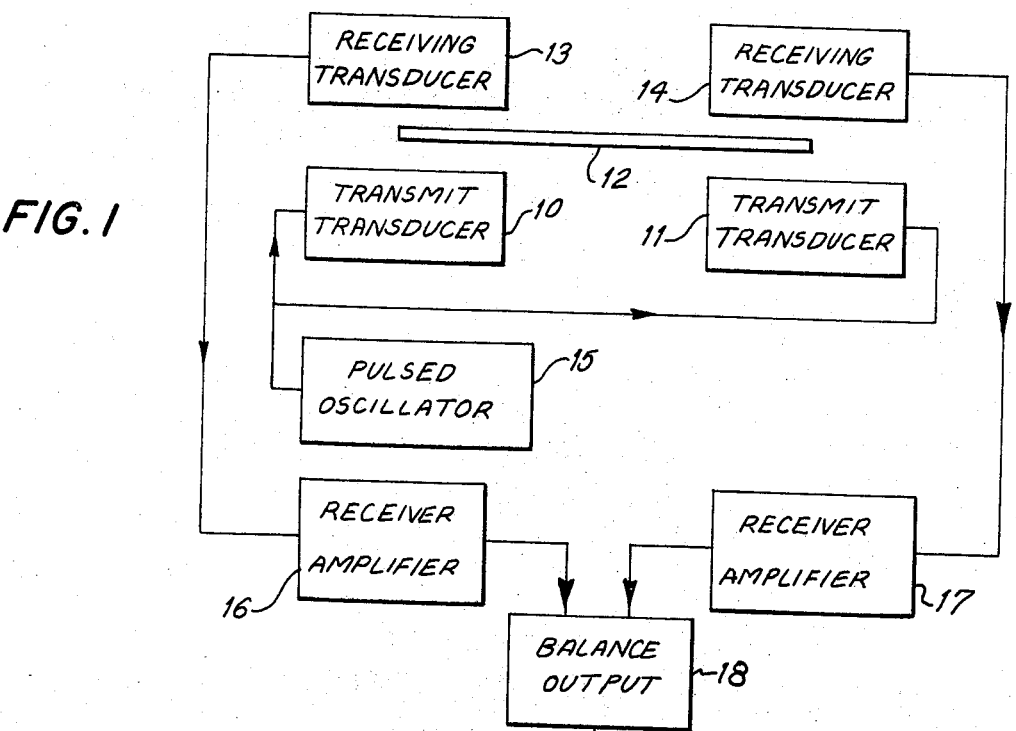
FIG. 1 is a schematic outline of the method and apparatus used.

According to this invention, four ultrasonic transducers are mounted on a platform so that one pair faces each other in overlapping relationship over one edge of the web and the other pair faces each other in overlapping relationship over the other edge, each pair being coupled acoustically through the air therebetween. In the arrangement herein each pair of transducers comprises a transmitting transducer and a receiving transducer.

Accordingly, the output of each receiving transducer is a function of the sonic coupling between it and its co-acting transmitting tranducer through the air gap between them.

Clearly, when a web is disposed between a pair of transducers the output is reduced so that the output of the receiving transducer is a function of the amount of blocking by the web.

Moreover, since the amplified output of each receiving transducer is balanced against each other, the final output is the net difference of the outputs from each side of the web. Thus the final output signal is proportional to the displacement of the web's centerline from a predetermined position. The polarity of the output is determined by which pair of transducers is least acoustically blocked by the web.

Referring now to the illustrative embodiment of the drawing, a pair of transmitting transducers 10 and 11 is disposed in overlapping relationship on each side of a web 12 and a corresponding pair of receiving transducers 13 and 14 is disposed in corresponding overlapping relationship on the other side of each of the edges of web 12.

The specific length of the transducers 10, 11, 13 and 14 is determined by considerations of expected web width variations, linearity of edge and the repeatability requirements of the smallest measurement made.

The transducers are so positioned relative to the edge of the web 12 so that there is an overlap or extension of the transducer long enough to accommodate the widest width of web used.

In the operation of this device, the pulsed operator 15 drives the transmitting transducers 10 and 11 at their resonance frequency or any other selected frequency. With the web 12 removed the output of each receiving transducer 13 and 14 is made equal to one another. This equalization of the output of the receivers 13 and 14 may be made before or after the use of the amplifiers 16 and 17. Varying the transmitter voltage to one of the transmitting transducers will also effect an equalization at the output.

The network output 18 is a function of the lack of balance between the pairs of transducers which in turn is a function of the interposed edges of the web 12.

The polarity of the output is dependent upon which pair of transducers has the maximum sonic coupling and hence the least web blockage of the signal. The output signal is of linear relationship to the movement of the centerline of the web in a properly designed apparatus.

The output 18 is used to control the conventional web driving mechanism to reposition the web until output returns to zero or some other preselected value.

For best results a pulsed drive is sent to the transmitting transducers, in order to eliminate or reduce standing waves. In these circumstances the pulse width is less than the transit time of the ultrasonic wave between the transducers.

The pulse drive is preferably of a frequency equal to the resonance frequency of the transmitting transducer. Thus, for example, for transducers spaced four inches apart, the pulse width should be less than 0.4 millisecond. The repetition rate should be as long as possible consistent with the response and other factors. The transducers resonant frequencies employed should be consistent with pulse width requirements, optimum transducer efficiency and the medium through which the energy is transmitted. Frequency ranges of 30 to 100 kilocycles are of use, but other frequencies are operable and depending on circumstances may even be more desirable.

Figure 2:
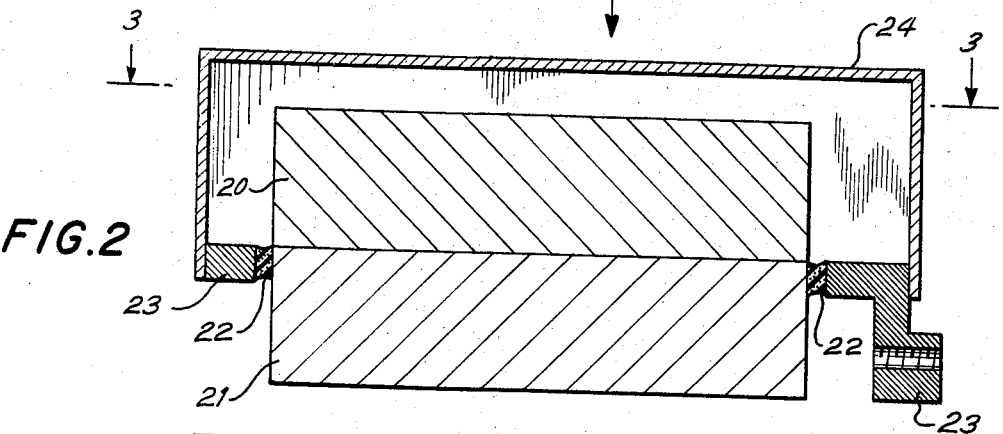
FIG. 2 is a section view of an ultrasonic transducer.
Figure 3:
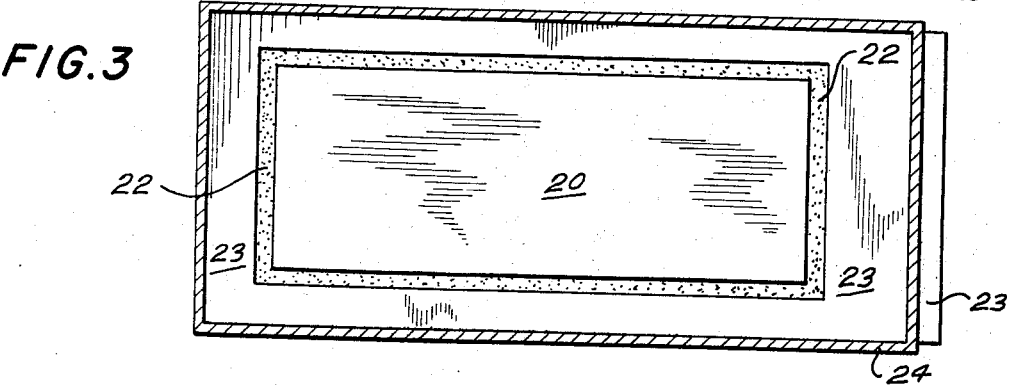
FIG. 3 is a section view taken substantially on line 3—3 of FIG. 2.

While various ultra-sonic transducers may be used, the use of piezoelectric bars shown in FIGS. 2 and 3 give good results as they can be formed in substantial length with uniform activity.

Good linearity is obtained when the receiving transducer has resonance near the frequency of operation. However, modular type of transducer sections may be used when their use is consistent with linearity and other requirements.

Turning to FIGS. 2 and 3, the polarized piezoelectric bar 20 is attached to a metallic bar 21 by conventional bonding means.

This laminate construction is especially suitable for transmission of sound in a gas medium. The transmitting and the receiving transducers are acoustically isolated from one another by means of suitable mountings 22 thereby preventing an acoustical short circuit. The mounting 22 may be any adequate acoustic isolating material such as rubber, silicone rubber and the like, which is bonded both to the transducer bar 21 and to the frame 23. However, other mounting methods which will offer sufficient isolation are operable. A cover 24 is secured to frame 23 in order to protect the crystal from damage. The assembled transducers are then mounted to a support adjacent the web 12 with their sound radiating surfaces disposed in parallel face to face relationship for maximum efficiency.

I claim:

1. Apparatus comprising tranducer means for establishing an ultrasonic energy field adjacent opposite edges of a web, circuit means responsive to said transducer means for providing a signal having a magnitude and polarity dependent upon the extent and direction of displacement of said web from a predetermined path.

2. Apparatus as defined by claim 1, said transducer means comprising a pair of transducers, said circuit means including means for comparing the outputs of said pair of transducers.

3. Apparatus comprising a web, a first pair of transmitting and receiving ultrasonic transducers disposed in suitable spaced apart face to face relationship overlapping one edge of said web, a second pair of transmitting and receiving ultrasonic transducers disposed in suitable spaced-apart face to face relationship suitably overlapping the other edge of said web, means for energizing said transducers to establish an ultrasonic energy field between each of said transmitting and receiving ultrasonic transducers, means responsive to said receiving transducers for providing a signal having a magnitude and polarity corresponding to the extent and direction of displacement of said web from a predetermined path.

References Cited

UNITED STATES PATENTS

| | | |
|---|---|---|
| 2,996,630 | 8/1961 | Bensema et al. |
| 3,051,927 | 8/1962 | Mazzagatti _____ 340—10 X |
| 3,087,140 | 4/1963 | O'Neill _____ 340—15 X |
| 3,100,889 | 8/1963 | Cannon _____ 340—259 |
| 3,108,032 | 10/1963 | Carlson _____ 226—45 X |
| 3,225,988 | 12/1965 | Drenning _____ 226—45 X |

SAMUEL FEINBERG, *Primary Examiner.*

BENJAMIN A. BORCHELT, *Examiner.*

R. M. SKOLNIK, *Assistant Examiner.*